United States Patent
Beuth, Jr. et al.

(10) Patent No.: US 10,035,220 B2
(45) Date of Patent: Jul. 31, 2018

(54) PROCESS MAPPING OF TRANSIENT THERMAL RESPONSE DUE TO VALUE CHANGES IN A PROCESS VARIABLE

(71) Applicant: Carnegie Mellon University, Pittsburgh, PA (US)

(72) Inventors: Jack Lee Beuth, Jr., Pittsburgh, PA (US); Jason Cho Fox, Pittsburgh, PA (US)

(73) Assignee: Carnegie Mellon University, Pittsburgh, PA (US)

(*) Notice: Subject to any disclaimer, the term of this patent is extended or adjusted under 35 U.S.C. 154(b) by 161 days.

(21) Appl. No.: 14/776,445

(22) PCT Filed: Mar. 14, 2014

(86) PCT No.: PCT/US2014/029096
§ 371 (c)(1),
(2) Date: Sep. 14, 2015

(87) PCT Pub. No.: WO2014/144613
PCT Pub. Date: Sep. 18, 2014

(65) Prior Publication Data
US 2016/0041111 A1    Feb. 11, 2016

Related U.S. Application Data

(60) Provisional application No. 61/852,313, filed on Mar. 15, 2013.

(51) Int. Cl.
*G01K 1/00* (2006.01)
*B23K 31/12* (2006.01)
(Continued)

(52) U.S. Cl.
CPC ............ *B23K 31/12* (2013.01); *B23K 31/02* (2013.01); *B29C 67/0077* (2013.01); *B33Y 40/00* (2014.12); *B23K 2203/14* (2013.01)

(58) Field of Classification Search
CPC ..................................................... B23K 31/12
(Continued)

(56) References Cited

U.S. PATENT DOCUMENTS

2005/0118812 A1   6/2005   Donohue et al.
2008/0082288 A1   4/2008   Raad
(Continued)

FOREIGN PATENT DOCUMENTS

KR   1020110033549   3/2011
WO   WO2013019663    2/2013
(Continued)

OTHER PUBLICATIONS

International Search Report and Written Opinion dated Sep. 1, 2014 for corresponding Int'l. Appln. No. PCT/US2014/029096 (8 pgs.).

*Primary Examiner* — Igwe U Anya
(74) *Attorney, Agent, or Firm* — Fish & Richardson P.C.

(57) ABSTRACT

A method includes conducting a plurality of tests on process variables of a manufacturing process, with a test of the plurality of tests being associated with two combinations of process variables, the test having first values for a first combination of process variables at a first time and second values for a second combination of process variables at a second time, the test comprising: locally heating a region of a structure, wherein the local heating results in formation of a thermal field in the structure; assessing one or more thermal characteristics of the thermal field during a transition between the first combination of process variables and the second combination of process variables; and based on results of the plurality of tests, generating a process map of a transient response of the one or more thermal characteristics of the thermal field.

21 Claims, 13 Drawing Sheets

(51) Int. Cl.
 *B23K 31/02* (2006.01)
 *B29C 67/00* (2017.01)
 *B33Y 40/00* (2015.01)
 *B23K 103/14* (2006.01)

(58) Field of Classification Search
 USPC .......................................................... 702/130
 See application file for complete search history.

(56) References Cited

U.S. PATENT DOCUMENTS

| | | | |
|---|---|---|---|
| 2008/0296270 A1 | 12/2008 | Song et al. | |
| 2014/0249773 A1* | 9/2014 | Beuth, Jr. | B29C 67/0085 |
| | | | 702/155 |
| 2015/0219572 A1* | 8/2015 | Beuth, Jr. | B29C 67/0088 |
| | | | 702/136 |

FOREIGN PATENT DOCUMENTS

| | | | | |
|---|---|---|---|---|
| WO | WO 2013019663 A2 * | 2/2013 | ......... | B29C 67/0085 |
| WO | WO2014144613 | 9/2014 | | |

\* cited by examiner

PROCESS MAPPING OF TRANSIENT THERMAL RESPONSE DUE TO VALUE CHANGES IN A PROCESS VARIABLE

CROSS-REFERENCE TO RELATED APPLICATIONS

This application is a § 371 National Stage Application of PCT/US2014/029096, filed Mar. 14, 2014, which, in turn, claims the benefit of priority under 35 U.S.C. § 119(e) to provisional U.S. Patent Application No. 61/852,313, filed on Mar. 15, 2013, and is related to provisional U.S. Patent Application No. 61/852,437, filed on Mar. 15, 2013, International Application No. PCTIUS2013/055422, filed on Aug. 16, 2013, and International Application No. PCT/US2012/048658, filed on Jul. 27, 2012, the entire contents of each of which are hereby incorporated by reference.

STATEMENT REGARDING FEDERALLY SPONSORED RESEARCH AND DEVELOPMENT

This invention was made with partial government support under grants CMMI-0700538 and CMMI-1131579 awarded by the National Science Foundation. The government has certain rights in the invention.

FIELD OF THE USE

The present disclosure relates to process mapping for manufacturing processes.

BACKGROUND

Additive manufacturing (AM), also known as direct digital manufacturing, refers to a wide range of processes for the direct fabrication of final parts, functional prototypes, or both using rapid prototyping technology. In AM, parts are fabricated by deposition using a heat source to locally soften or melt material in order to fuse added material with existing material. In some AM processes (e.g., those based on friction stir welding), the material is heated enough to allow fusion of added and existing material without melting. In other AM processes, the material is melted, and as the heat source is translated across the part being fabricated, a bead is formed consisting of a moving melt pool with solidified material behind it. Material is fed into the heated region (either directly or by other techniques such as via a powder applied to the surface of the part), and the part is built up by multiple passes to form the part shape. AM is used for Free Form Fabrication ($F^3$), which is the rapid manufacture of a complete part, and for additive manufacturing and repair (AMR), which adds one or more features to an existing component, either as a manufacturing step or for component repair. For instance, AM can be used to build parts from titanium alloys, which has applications in the aerospace and medical implant industries.

SUMMARY

The present disclosure describes methods and apparatus relating to process mapping for manufacturing processes. The techniques described in this disclosure are applicable to a wide range of thermal processing methods. For illustration purposes, the techniques will be described in the context of additive manufacturing involving a melt pool. In these additive manufacturing (AM) processes, a part is fabricated by deposition of successive beads of molten material. AM and other similar manufacturing processes are controlled by primary process variables, including, for instance, heat source power (P), translation speed (V) of the heat source, and feed rate of the source material (MFR).

The techniques described herein provide a method for mapping the response behaviors (e.g., response times) of thermal process characteristics such as melt pool dimensions, solidification cooling rates, and average melt pool temperatures to value changes in identified process variables. The resulting process maps may be used to design process control systems that take into account the mapped response times. The techniques described herein are applicable to the deposition of beads of material used to build up complex three-dimensional shapes. The techniques can be applied to processes where no material is added. The techniques can be applied to map the response behavior of any thermal process characteristic in processes that do not include a melt pool. Although AM processes typically use a laser or electron beam as a heat source, the techniques can be applied to processes using any type of heat source.

In a general aspect, a method includes conducting a plurality of tests on process variables of a thermal process, with a test of the plurality of tests being associated with two combinations of process variables, the test having first values for a first combination of process variables at a first time and second values for a second combination of process variables at a second time, the test comprising: locally heating a region of a structure, wherein the local heating results in formation of a thermal field in the structure; assessing one or more thermal characteristics of the thermal field during a transition between the first combination of process variables and the second combination of process variables; and based on results of the plurality of tests, generating a process map of a transient response of the one or more thermal characteristics of the thermal field, with the transient response based on a function of the first combination of process variables and the second combination of process variables.

Implementations of the disclosure may include one or more of the following features. The process variables of each of the first and second combinations may be selected from a group comprising a power (P) variable associated with the thermal process, a translation speed (V) variable associated with the thermal process, a material feed rate (MFR) variable (or variable related to MFR), used in the thermal process, one or more structure geometry variables, and a structure temperature ($T_0$) variable. The first values for the first combination of process variables at the first time may include a first value for a first process variable at the first time and a first value for a second process variable at the first time, the second values for the second combination of process variables at the second time may include a second value for the first process variable at the second time and a second value for the second process variable at the second time, and assessing the one or more thermal characteristics may include assessing the one or more thermal characteristics during a transition between the first values and the second values of the first process variable and the second process variable while values of other process variables are held constant. The first values for the first combination of process variables at the first time may include a first value for a first process variable, the second values for the second combination of process variables at the second time may include a second value for the first process variable at the second time, and assessing the one or more thermal characteristics may include assessing the one or more thermal characteristics during a transition between the first value and the second value of the first process variable while values of other process variables are held constant. The one or more thermal characteristics of the thermal field may include a dimension of the thermal field, a temperature derivative, a thermal gradient, a cooling rate, an average temperature, or a temperature integral. Assessing the one or more thermal characteristics may include tracking values of the one or more thermal characteristics over a time or a distance needed to transition from an initial steady-state value of the one or more thermal characteristics to a final steady-state value of the one or more thermal characteristics. The transient response may be further based on a function of at least one of a rate of change between the first combination of process variables and the second combination of process variables, and a path through process variable space between the first combination of process variables and the second combination of process variables. The transient response may be further based on a change in geometry of the structure. The rate of change may be a variable rate of change between the first combination of process variables and the second combination of process variables. Locally heating the region may include depositing a bead of material onto a surface of the structure, and wherein the thermal field may be a melt pool. Depositing the bead of material may include melting a material source with a heat source. Locally heating the region may include forming a melt pool on a surface of the structure, and wherein the thermal field may be the melt pool. The thermal process may include an additive manufacturing (AM) process. The tests may be one or more experimental tests. The tests may be one or more simulations. The method may include using the process map to select process variable values for the two combinations of process variables to yield a selected response time of the one or more thermal characteristics. The method may include generating a plurality of process maps characterizing the thermal process for forming the structure, each process map corresponding to at least one of a geometry of the structure and a temperature of the structure. The method may include decomposing a fabrication of a complex structure into a combination of one or more geometries; and controlling the fabrication of the complex structure based on the process maps for forming each of the one or more geometries. A geometry of the complex structure may include at least one of a height of the geometry and a width of the geometry. The structure may include a part that is fabricated in the thermal process. The actions of conducting and generating are implemented by one or more processing devices.

Particular implementations of the subject matter described in this disclosure may be implemented to realize one or more of the following potential advantages. In general, the generation of process maps may enable the relationships between process variables and final part quality to be understood with minimal experimentation or simulation. The processing knowledge that may be gained from process mapping techniques can be extended over a wide range of process variables, thus providing a way to compare results from different pieces of equipment, different manufacturing techniques, or both. Furthermore, process mapping techniques can be used as the basis for an evolving database characterizing the deposition of complex shapes. Specifically, process mapping of transient response allows for process planning and process control systems to account for the time for thermal fields to respond to value changes in process variables, such as those imposed by a control system attempting to maintain a constant process characteristic (e.g., as melt pool size or shape) as other process variables (e.g., geometry or heat source power transferred to the substrate) change as a part is built. Process mapping of transient response includes the mapping of not only response times, but the full response behavior of the thermal process characteristic (including how it changes over time). Response behavior may be different in different regions of processing space, requiring process mapping for its effective characterization.

Details of one or more implementations are set forth in the accompanying drawings and the description below. Other features, objects, and advantages will be apparent from the description, the drawings, and the claims.

DETAILED DESCRIPTION

Although the techniques described in the present disclosure are applicable to a wide range of thermal processing methods, various implementations will be described below in the context of additive manufacturing involving a melt pool. While specific implementations are described, other implementations may exist that include operations and components different than those illustrated and described below. For example, the techniques described herein can be used to develop AM or direct digital manufacturing processes that involve the feeding of material in wire or powder or other form into a melt pool. The techniques described herein can be applied to a variety of processes involving the formation of a melt pool, such as welding processes (even if not used to build a shape). These techniques may also be applied to other AM processes that do not involve the direct feeding of material into the melt pool, such as (but not limited to) powder bed AM processes, and to analogous welding processes.

Figure 1:
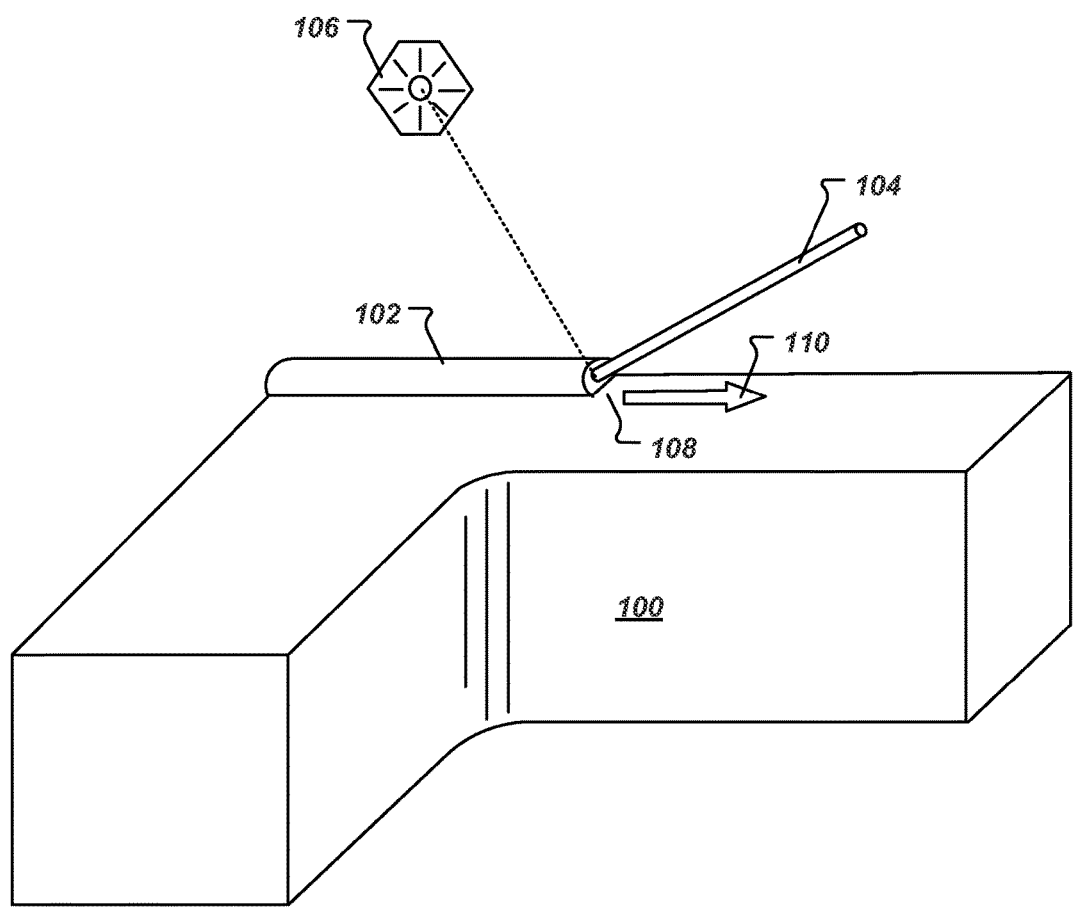
FIG. 1 is a block diagram showing an example of geometry deposition using a beam-based additive manufacturing process.

FIG. 1 is a block diagram showing an example of geometry deposition using a beam-based additive manufacturing (AM) process. In such an AM process, a structure or part 100 is fabricated by deposition of successive beads 102 of molten material. The material is provided from a material source 104, such as a wire feed (as shown), a powder feed, or a powder bed. A heat source 106, such as an electron beam, a laser beam, or an electric arc, melts the material source 104 to generate the bead 102 while melting some of the top surface 108 of the part 100. The heat source 106 is translated relative to the part 100 (or the part is translated relative to the heat source) to cause deposition of beads in a desired geometry to form the part 100.

A melt pool itself is not required. For instance, in beam-based surface heat treating processes, in which a beam is rapidly moved across a surface to alter near-surface microstructure without melting, the techniques described herein can be used to map critical cooling rates and thermal gradients, and how rapidly they can be altered. Finally, the type of heat source involved is also general. For instance, different welding processes use a variety of mechanisms for heating, including a metal arc, gas combustion, electrical resistance, friction, and ultrasonics. The techniques described herein can be applied to each of these and others.

For a single specified material or a specified combination of materials, the primary process variables that control AM processes are power (P) of the heat source 106, the translation speed (V) of the heat source 106, the material feed rate (MFR, in units of volume per time) of the material source 104 or a related variable, one or more process variables related to the geometry being deposited and the temperature ($T_0$) of the part 100 away from the heat source 106. These process variables also control other similar manufacturing processes, such as welding processes (including those that do not involve melting of the material) and beam-based surface heat treating processes (which would involve the limiting case of MFR=0). In addition, many secondary process variables and conditions can affect processing, including, for instance, beam focus, wire or powder particle diameter, deposition environment (e.g., deposition in a vacuum or in an inert gas environment), and other variables.

The techniques described herein provide a method for mapping the role of primary process variables (in particular, an initial set of values and a final set of values) in determining the response behavior of a thermal process characteristic resulting from a change in values of primary process variables, as secondary process variables are held constant. The techniques can also be used in cases where secondary processes vary, but they are determined by the primary process variables. In cases where secondary process variables change independently or randomly, the techniques can help identify when they affect response behavior by first separating out the role of the primary process variables. Once this is done, studies of secondary process variables can be performed by adding them to the process variable list and mapping their influence on process characteristics under steady-state and transient conditions.

The thermal characteristics that are mapped for their transient behavior can be any quantity related to the thermal field, including thermal field dimensions, temperature derivatives (in time or space), temperature integrals (in time or space), or combinations of these. The thermal characteristic is determined for the first set of values of the process variables, for the transition between the first set and second set of values of the process variables, and for the second set of values of the process variables. A process map of the thermal characteristic may be generated as a function of the first set of values and the second set of values of the process variables.

The resulting transient process maps may be used to determine when and how to change process variables to achieve a desired process characteristic transient behavior. For instance, the process maps may be used as a guide to determining at what time in advance of encountering a change in deposition geometry a process variable change is needed to maintain the process characteristic of melt pool size. The process maps may also be used as a guide to how to change primary process variables in order to achieve a desired response behavior, such as temporarily increasing the magnitude of a power change to decrease the time needed to change melt pool size. The process maps may be used to identify pairs of initial and final values of process variables that yield a similar transitional behavior.

The techniques described herein are applicable to the deposition of single beads of material onto an existing large plate. These techniques can also be applied to the fabrication of more complex three-dimensional shapes. Although AM processes are typically used to fabricate metal parts, the techniques described herein can be used to support the fabrication of parts of any material compatible with thermal AM processing, welding, beam-based surface heat treating, or other similar manufacturing processes. As described in this disclosure, process maps are developed for a single material or a specified combination of materials. If the material or material combination is changed, new process maps should be developed.

Figure 2:
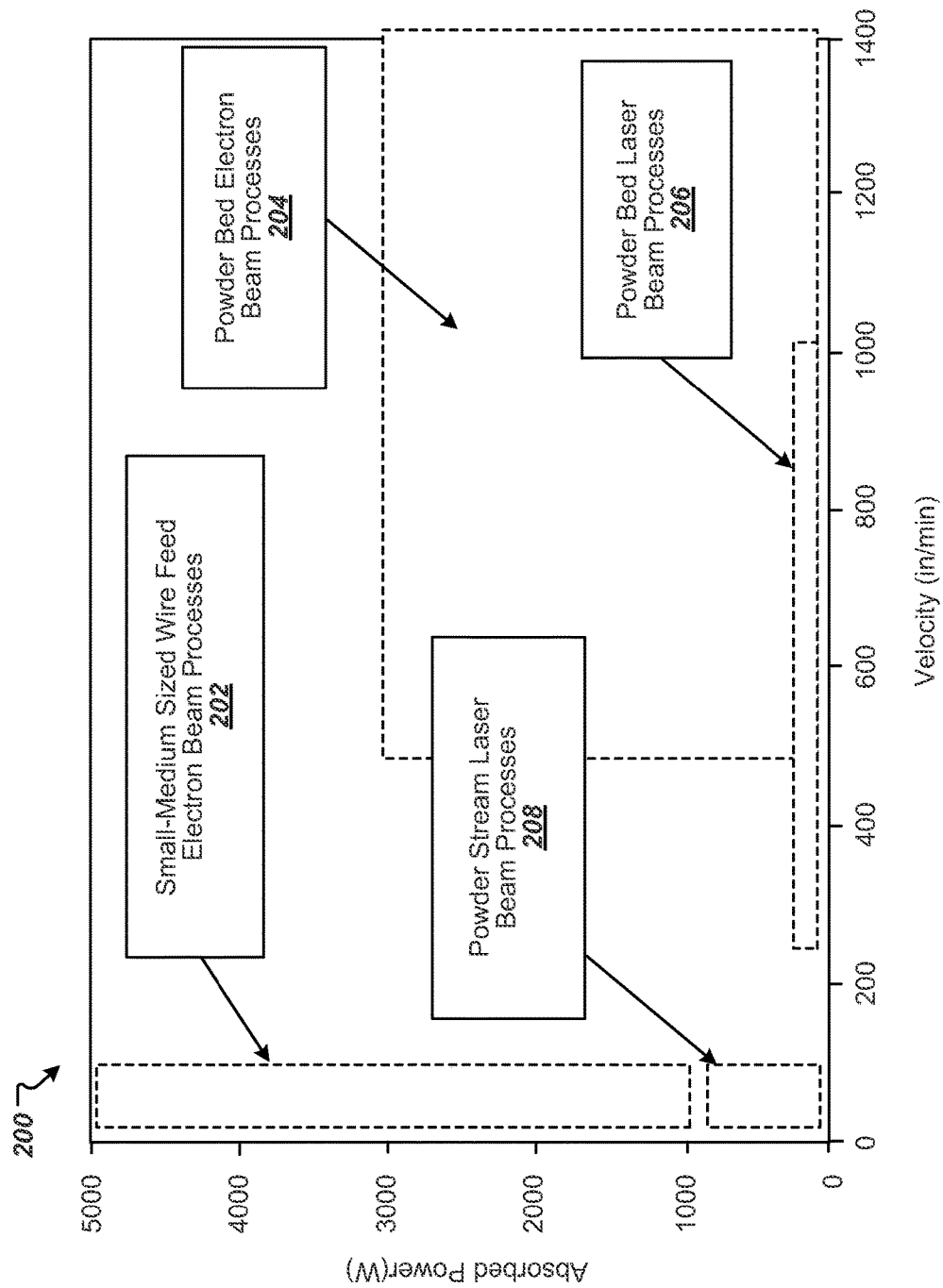
FIG. 2 is a plot of approximate ranges of power and velocity used in examples of additive manufacturing processes for metals.

FIG. 2 is a plot 200 of approximate ranges of power and velocity used in examples of additive manufacturing processes for metals. Many types of manufacturing processes spanning a wide range of process variables fall under the purview of AM processing. For instance, AM processes include small- and medium-scale electron beam wire feed processes 202, electron beam powder bed processes 204, laser power bed processes 206, and laser powder stream processes 208. Large-scale electron beam processes operating at beam powers of, e.g., 20 kW or more (not shown in FIG. 2) may also be considered to be AM processes. The techniques described herein are applicable to the full range of process variables used in these and other AM processes.

Melt Pool Dimensions as Process Characteristics

Figure 3:
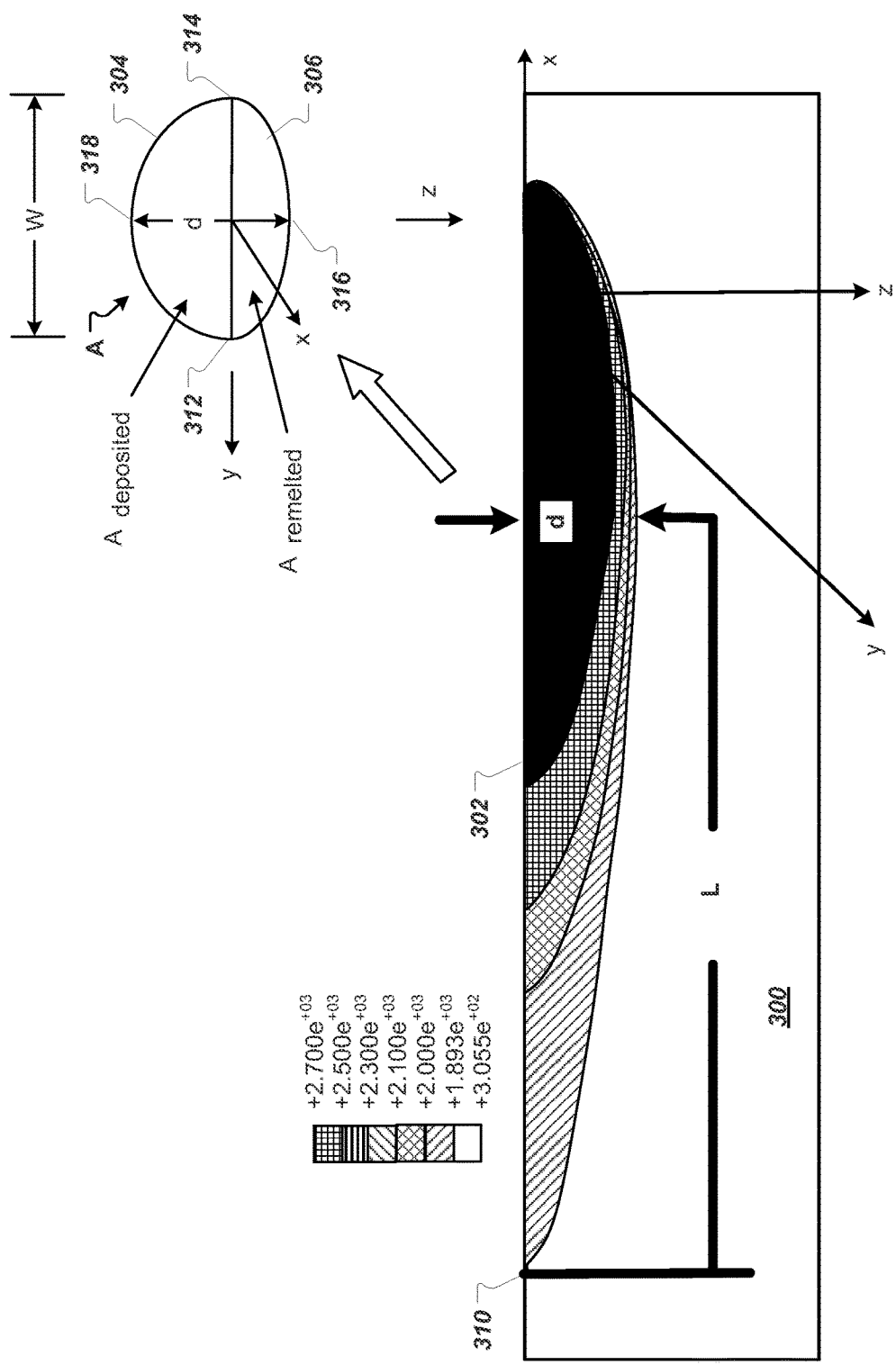
FIG. 3 is a diagram of melt pool dimensions and melt pool locations.

Process mapping techniques can be used to map the transient response of any thermally related process characteristic, such as solidification cooling rates at a specific location along a melt pool solidification front, average temperatures within a region defined by a specified minimum temperature, and other thermally related process characteristics. For illustration, the transient response of a melt pool dimension will be described. FIG. 3 is a diagram of melt pool dimensions and locations. Referring to FIG. 3, when a bead of material is deposited onto a surface of a part 300 in an AM process, a melt pool 302 is formed including the molten bead 304 of material and any material 306 of the surface that has melted as a result of the bead deposition. A side-view cross-section of a melt pool 302 on the surface of a part 300, derived from a finite element model, depicts melt pool dimensions that may be relevant to process control. In FIG. 3 the melt pool 302 is moving in the positive x direction (i.e., the direction of V).

In general, when a local heat treatment is applied to a region of a part (e.g., via a moving heat source), a thermal field is created in the part. In some instances, some of the thermal field is melted; in other instances, the temperatures of the thermal field are raised relative to the temperature of the surrounding material, but melting does not occur. In the following description, reference is made to the dimensions of the melt pool; however, the dimensions of the thermal field may be treated similarly to the dimensions of the melt pool.

In FIG. 3, the maximum melt pool cross-sectional area, A, is the area of the melt pool 302 normal to the x-axis (and thus normal to the direction of travel of the melt pool 302), at the deepest point of the melt pool 302. The melt pool length, L, is the length of the melt pool 302 from the x location of A to a location 310 of the trailing tip of the melt pool 302. The melt pool depth, d, is indicative of the maximum depth of the melt pool 302. In some instances, d is the actual maximum depth of the melt pool 302. In other cases, d is an effective depth of the melt pool 302 as calculated from A using the formula $d=\sqrt{2A/\pi}$. The maximum melt pool cross-sectional area, A, equals the cross-sectional area of the deposited bead 304 ($A_{deposited}$) plus the cross-sectional area of the material 306 melted on the surface of the part 300 ($A_{remelted}$). The melt pool length, L, relates to the shape of the solidification front behind the melt pool 302. In some cases, a dimensionless variable, L/d, is used, which relates to the aspect ratio or shape of the trailing end of the melt pool 302.

Primary Process Variables

The process mapping techniques described herein enable mapping of the role of primary process variables on the transient behavior of process characteristics such as melt pool dimensions, cooling rates, and average temperatures within the melt pool. First, however, the primary process variables determining the chosen process characteristic must be established. In some implementations, the primary process variables are P, V, MFR, one or more variables describing the geometry being mapped, and the part temperature ($T_0$) away from the heat source.

The part temperature, $T_0$, can be due to active preheating of the part through external means or can be due to heat build-up from the heat source, e.g., caused by prior deposition of material. Part temperature away from the heat source is easily monitored in real time. Any location may be selected for monitoring $T_0$, provided the location is away from the local thermal field of the heat source and is consistent throughout the tests (simulations or experiments).

In other embodiments, an alternative primary variable, $\gamma$, can be used in place of the MFR. The variable $\gamma$, which represents the deposited to remelted area ratio ($\gamma=A_{deposited}/A_{remelted}$), directly relates the size of the added bead of material to the size of the material melted in the existing part and thus relates the effect of those sizes on heat transfer into the part. The variables $\gamma$ and MFR are related. Specifically, MFR=V*$A_{deposited}$, where $A=A_{deposited}+A_{remelted}$. From these relationships, it can be determined that MFR=V*A/(1+(1/$\gamma$)). In manufacturing applications, $\gamma$ is bounded by a value of 0 (for no added material) to infinity (for no remelting of the substrate material). When process mapping is used to determine the role of process variables on melt pool dimensions, to determine how local bead geometry affects melt pool dimensions, or to determine both, the use of $\gamma$ may be more relevant. For manufacturing control, MFR may be the more relevant variable.

Alternative process variables related to MFR may also be used for process mapping. For example, the variable $\phi=A_{deposited}/A$ may be used. The variable $\phi$ takes on a role similar to $\gamma$, except that $\phi$ has an operating range from 0 (for no added material) to 1 (for no remelted substrate material).

The transient behavior of a process characteristic will generally depend on 1) the initial set of primary process variables (e.g. $P_{initial}$, $V_{initial}$, $\gamma_{initial}$ (or $MFR_{initial}$ or $\phi_{initial}$), (deposition geometry)$_{initial}$, and $T_{initial}$), 2) the final set of process variables (e.g. $P_{final}$, $V_{final}$, $\gamma_{final}$, (deposition geometry)$_{final}$, and $T_{0final}$), 3) the path through process variable space taken between the initial and final values of the process variables (in general there is an infinite number of these) and 4) the rate of change in the values of the process variables. The rate of change between value combinations of process variable values does not have to be constant, and in such cases the transient response may depend on the variable rate used. The path between initial and final values of process variables and the rate of change between the initial and final values can be used to change response behavior between two combinations of process variable values. For instance, if it is desired to increase melt pool size by a change in beam power, instead of simply changing beam power to that which will yield the correct steady-state larger melt pool size, a short-term overshoot in power may be applied to speed transition to the new steady-state melt pool size. A process map can be used to determine the role of the rate of change and the path taken through process variable space.

In cases where the change between two combinations of process variable values is very rapid (the limiting case being an instantaneous or step change), the path through processing variable space and the rate of change in values of process variables no longer determine transient response, and transient behavior becomes dependent on the initial and final value combinations of process variables. Although the process mapping techniques are not limited to very rapid changes in process variables, for simplicity the discussion of the role of primary process variables will not include rate and path effects.

Based on the discussion thus far, even with just the set of 5 primary process variables, P, V, $\gamma$, deposition geometry (which could depend on multiple variables), and $T_0$, the task of mapping transient response behaviors (such as response times) may be difficult. In some situations, however, the task can be simplified. For instance, in some practical cases, the deposition geometry and $T_0$ will remain constant, with only P, V, and $\gamma$ potentially being altered. Also, the combinations of changing values of process variables that are of practical interest may be limited. Further, there may only be an interest in altering one process variable, such as P. In this case, response behavior would depend on $P_{initial}$, $P_{final}$, V, $\gamma$, deposition geometry, and $T_0$. Other simplifications are possible, and these are discussed later.

Any methods for representing the mapping of transient response behaviors are valid as long as they follow the rules for their dependence on process variables outlined above. However, a representation that builds upon process mapping methods described in provisional U.S. Patent Application No. 61/852,437, International Application No. PCT/US2013/055422, and International Application No. PCT/US2012/048658 is described herein. Information from the disclosures of the above related applications is summarized below. These representations allow for potential additional simplifications to the mapping of transient response.

Commonly Fabricated Geometries

Figure 4:
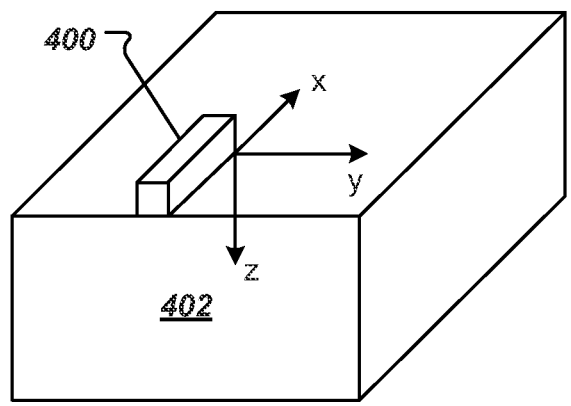
FIG. 4 is a block diagram of a single bead geometry.
Figure 5:
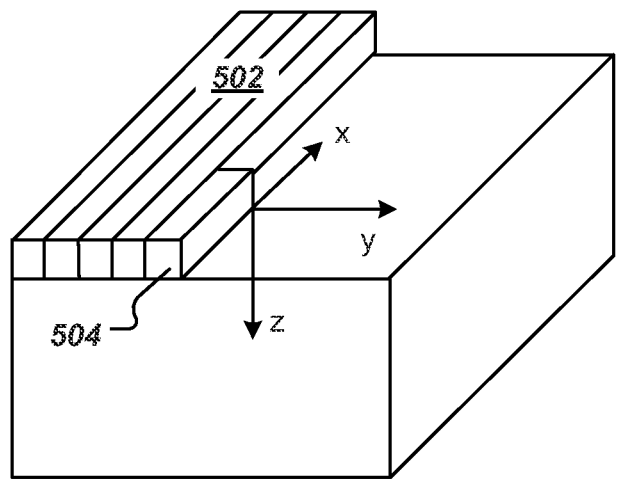
FIG. 5 is a block diagram of a sequential bead geometry.
Figure 6:
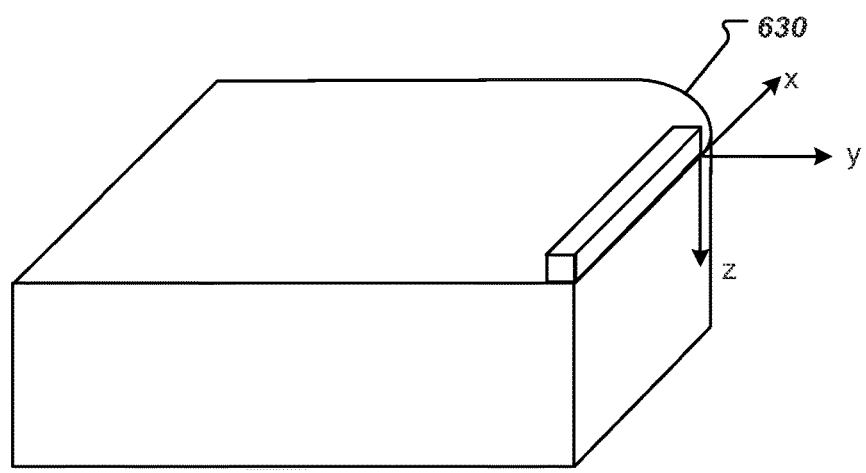
FIG. 6 is a block diagram of an external radius geometry.

Process mapping of the deposition of complex 3-D shapes can be decomposed into combinations of simpler, commonly fabricated geometries, each of which may have one or a series of associated process maps. FIGS. 4-6 are block diagrams showing examples of some commonly fabricated geometries or features. The geometries shown in FIGS. 4-6 are provided for illustration. Other commonly fabricated geometries are presented in the related applications referenced above. In the geometries shown in FIGS. 4-6, the coordinate origin is taken to be the location where the heat source is positioned, and deposition proceeds in the positive x direction. In the geometries shown in FIGS. 4 and 5 (referred to as "steady-state geometries"), the geometry is constant in the deposition direction (away from free edges of the geometry). In the geometries shown in FIG. 6 (referred to as a "transient geometry"), the geometry changes in the deposition direction.

FIG. 4 is a block diagram of a single bead geometry. In single bead deposition, a single bead 400 of material is deposited onto a flat plate 402. In general, the plate 402 is large enough in the x and y directions that the melt pool geometry in the middle of the plate 402 (and other characteristics of the near-melt-pool thermal field) are not affected by the free edges of the plate 402. The plate thickness (in the z direction) may be large enough that the bottom surface does not affect the near-melt-pool thermal field. Alternatively, the plate thickness may be a thickness selected by a user and held constant across all tests.

FIG. 5 is a block diagram of a sequential bead geometry. This geometry may be used to fill an internal area. For this geometry, many beads 502 are assumed to exist to the left of a bead 504 being deposited.

FIG. 6 is a block diagram of an external radius geometry. For this geometry, there may be various radii, e.g., external radius 630, to be mapped. In addition, various turn angles can be mapped; a 90° turn is a common example of a turn angle. The radius geometry may be executed in combination with various geometries, such as the steady-state geometries described above.

One or more steady-state geometries, transient geometries, or both may be combined to result in the deposition of a single layer of an arbitrary planar shape. Building of successive layers allows the building of arbitrarily complex 3-D shapes.

In steady-state geometries (e.g., the geometries shown in FIGS. 4 and 5), if process variables are held constant during deposition, then the near-melt-pool thermal field does not change because the geometry of the feature does not change in the deposition direction. In transient geometries (e.g., the geometry shown in FIG. 6), as deposition progresses under constant P, V, γ, and $T_0$ conditions, the near-melt-pool thermal field is generally changed via its interaction with the radius. In this disclosure, process maps of steady-state geometries will be used to map out the transient response behavior due to rapid changes in P, V, γ, and $T_0$. The process maps of steady-state geometries can be a guide for how to dynamically change P, V, γ, and $T_0$ during the deposition of transient geometries to maintain a constant thermal process characteristic. The methods can also be used to map out the transient response due to a step change in geometry (such as an abrupt transition between thin-walled and bulky features). A transient geometry similar to that shown in FIG. 6 can also be mapped for transient response; however, because the geometry itself is transient, results will also depend on the initial x location of the melt pool when the change in value of the process variable is made. Also, changes in values of the process variable at slow rates to maintain process characteristic values as the melt pool interacts with the radius may be of interest, and in such cases results will be path and rate dependent (not just a function of initial and final P, V, γ, and $T_0$).

P-V Process Mapping of Steady-State Melt Pool Dimension A

Figure 7:
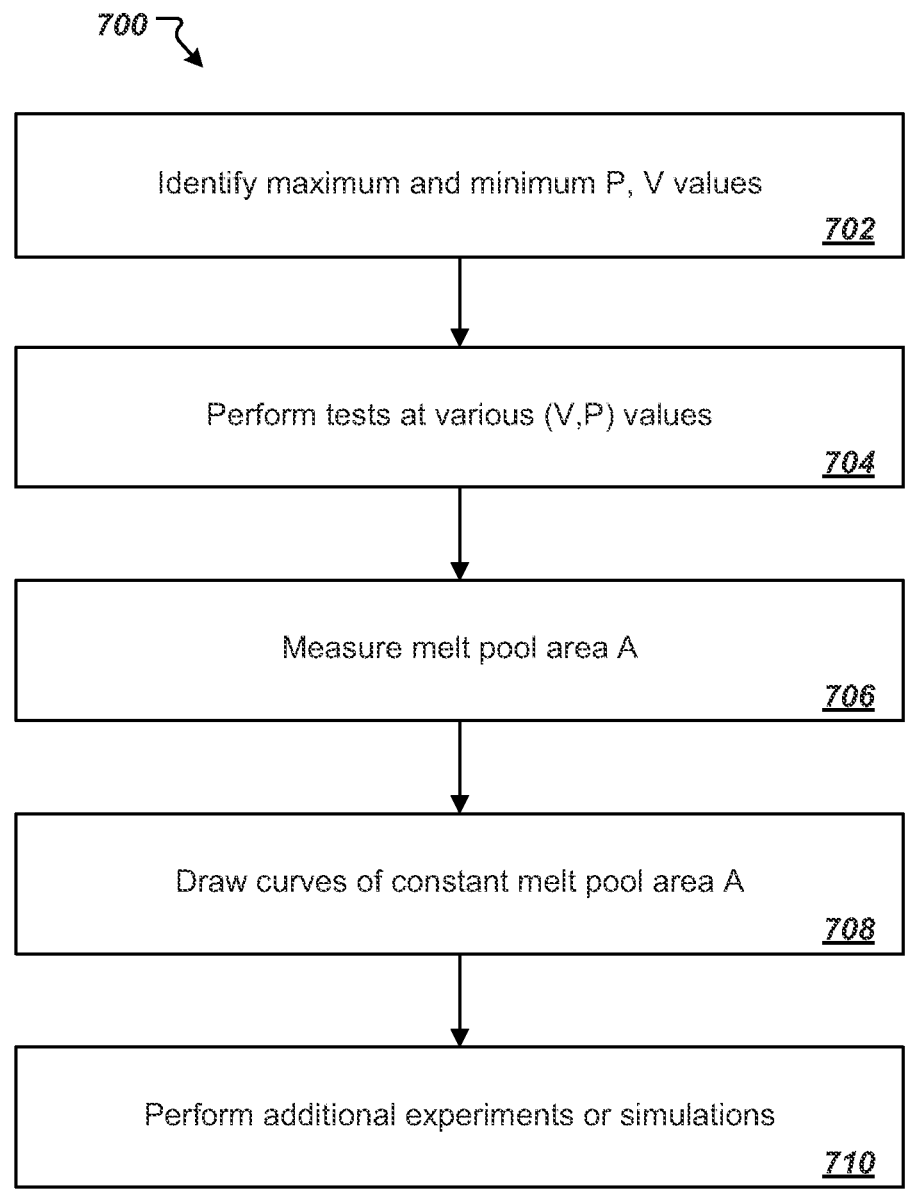
FIG. 7 is a flowchart of an example of a process for generating a power-velocity (P-V) process map for a melt pool area A.

Process mapping of steady state values of a thermal characteristic, e.g., melt pool area A, in terms of primary process variables P and V, applicable to AM processes, will now be described with reference to FIG. 7. FIG. 7 is a flowchart of an example of a process 700 for generating a power-velocity (P-V) process map for the melt pool area A. In the process 700, all other primary process variables are assumed to be held constant.

In AM processing, the value of γ is typically held constant, so process maps for a single value of γ may be most relevant. Thus, details are given for P-V process mapping for a single value of γ (or ϕ) using a small number of initial experiments and/or simulations. Process maps for a fixed value of MFR, ϕ, or another parameter related to MFR may also be developed using similar procedures. The melt pool area can also be mapped for multiple values of γ (e.g., for selected values of γ and/or for the entire range of γ) using similar techniques.

Other process variables (related to part geometry and far-field temperature $T_0$) are also assumed constant. Thus, the P-V process map will be developed for a single commonly fabricated geometry, or, if the commonly fabricated geometry has a variable associated with it (such as wall height or distance from a free edge), the P-V process map may be determined for a single value of that variable.

To generate a P-V process map for A for a single value of γ, part geometry, and $T_0$, minimum and maximum P and V values of interest (e.g., a range of P and V relevant to a particular type or types of AM process) are identified (702) to define the P and V operating ranges for the process map.

In some implementations, a series of tests within these P and V ranges may be performed all at once (e.g., testing a grid of P-V combinations), from which curves of constant melt pool area A can be approximated. In some implementations, an initial, approximate plot of curves of the melt pool area can be generated based on a small number of experimental or simulated tests.

For these initial tests, γ can be any single value between 0 (no added material) and infinity (no remelted material), and the resulting process map will be for that value of γ. However, because the melt pool areas, A, are not known for each case (assuming no prior tests have occurred), a nonzero value of γ may not be able to be accurately specified before each test is performed. To address this issue, the first tests may be performed with γ=0 (no added material). Subsequent tests (see below) can be performed with γ=0 to create an increasingly accurate P-V process map for γ=0. Alternatively, values of A extracted from the first tests with γ=0 can be used to approximate MFR values associated with a desired, nonzero value of γ in subsequent tests (ultimately creating an accurate P-V process map for a single nonzero value of γ).

For each test, the melt pool area A is measured or assessed (706), along with $A_{deposited}$ (or $A_{remelted}$) to confirm the value of γ. Once the melt pool area A is obtained from each of the tests, it can be interpolated between the data obtained from the first tests to generate a first P-V process map of curves of constant melt pool area A (708).

The constant A curves may be defined more precisely through additional experiments and/or simulations (710), e.g., at midpoint locations between points on the process map representative of existing tests. Curves may be generated between test data points using any appropriate curve fitting model.

If desired, additional process maps may also be generated at different γ values, for different geometries or values of the geometric variable for one geometry, and for different values of $T_0$. Over time, data can be added to a process map such that the process map more accurately characterizes a particular piece of equipment. In some implementations, the additional experiments and/or simulations may involve changing secondary process variables to quantify their role in changing A across the range of primary process variables.

Similar mapping techniques can also be applied to a generalized thermal field, such as a region of a surface (or subsurface) that is heated (that does not have to have a maximum temperature greater than or equal to the melting temperature). Even in the case of the existence of a melt pool, it may be important to quantify dimensions of regions at temperatures above or below the melting temperature (within or outside of the melt pool boundary, respectively).

Figure 8:
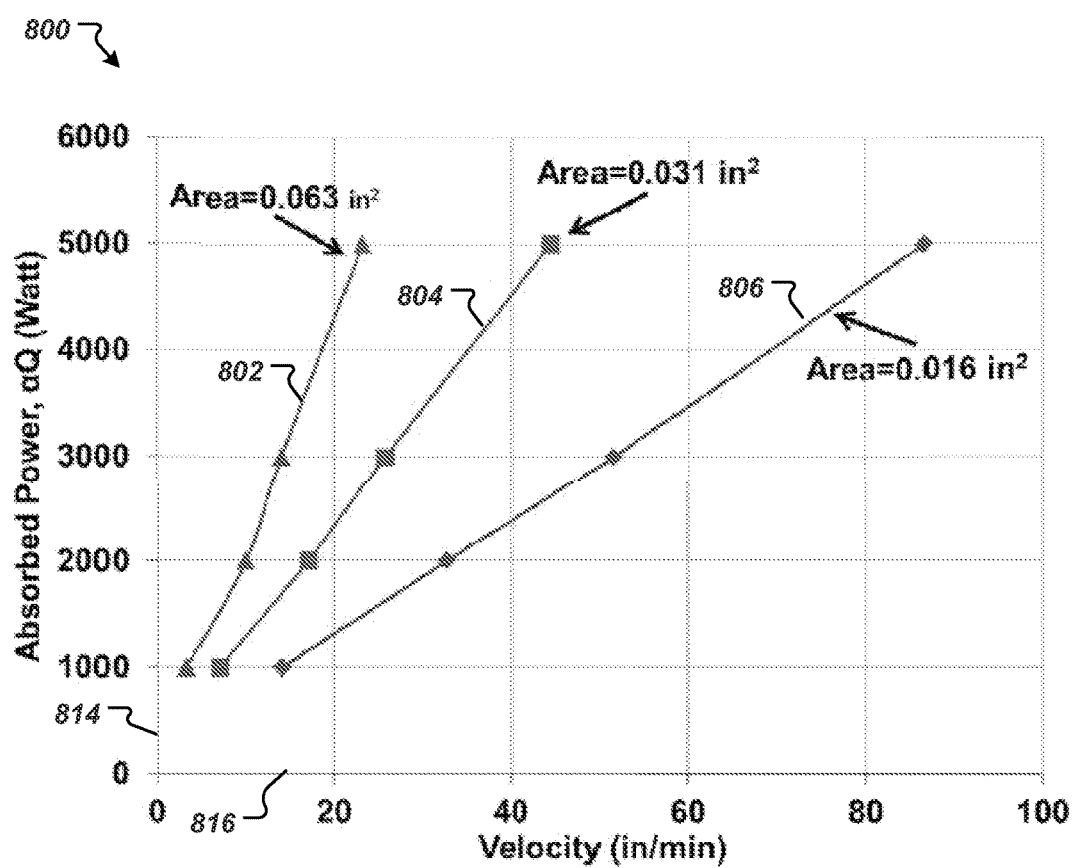
FIG. 8 is an example of a P-V process map showing curves of constant melt pool area A.

FIG. 8 is an example of a P-V process map 800 showing curves of constant melt pool area A. As shown in FIG. 8, curve 802 represents A=0.063 in$^2$, curve 804 represents A=0.031 in$^2$, and curve 806 represents A=0.016 in$^2$. The P-V process map 800 for A is based on numerical modeling of a wire feed electron beam AM process over multiple simulations. The map is for the deposition of a single bead of the titanium alloy Ti-6Al-4V (referred to herein as Ti64) with a single value of γ and $T_0$. The minimum and maximum P values are approximately 1 kW and 5 kW, respectively, as shown by axis 814, and the minimum and maximum V values are approximately 5 in/min and 90 in/min, respectively, as shown by axis 816.

Once the P-V process map in terms of A (e.g., map 800) is constructed, the P and V values yielding a desired A, $A_{deposit}$, and MFR (in units of volume/time) can be determined. The P-V process map in terms of A (e.g., map 800) can also be used as a guide to maintaining A as values of P, V, and MFR are changed.

Generation of P-V process maps for commonly fabricated geometries allows A to be maintained across all geometries. Once P-V maps are developed for commonly fabricated geometries, complex 3-D part geometries can be fabricated by decomposing the complex geometries into combinations of common mapped features.

In practice, process mapping may be simplified. For instance, the effect of $T_0$ may only be a concern in certain cases, such as continuous deposition (i.e., no pausing between bead deposition) resulting in heat build-up, or deposition of one bead at a time followed by a pause to allow the part to cool to ambient temperature. If the effect of $T_0$ is only of concern in these cases, then process maps can be generated only for these cases. As another example, when a part is actively preheated to a particular $T_0$ value prior to deposition, only a few values of $T_0$ may be of interest. Process mapping for multiple values of γ can be similarly simplified by first constructing maps for the extreme values of γ=0 (no added material) and γ approaching infinity (no remelted material) to determine the importance of γ on A.

Tests for Mapping Transient Response

Where simulation of or experimentation on a single geometry with a fixed $T_0$ and γ is used to develop a steady-state P-V process map as described above with reference to FIG. 7, a simulation or test for transient response in P-V space will involve changes in P and/or V. For example, deposition is performed or modeled for ($P_{initial}$, $V_{initial}$) so that a steady state in the thermal characteristic (e.g., melt pool area A) is obtained, then a change is made to ($P_{final}$, $V_{final}$) and deposition continues until a new steady-state thermal characteristic is achieved. The data typically extracted from each test would be the initial (steady-state) thermal characteristic value, the final (steady-state) thermal characteristic value, the time or distance needed to transition from initial to final steady-state values, and the values of the thermal characteristic during the transition (typically plotted as a function of time). With proper planning, these tests or simulations can also be used to obtain the process map for steady-state conditions as described above.

Tests where different variables or additional variables are changed may be performed. For example, MFR may be changed by itself or in combination with P and V. As another example, tests with an abrupt geometry change may be performed. Regardless of what variables are changed, the transient behavior of a process characteristic may generally depend on 1) the initial set of primary process variables (e.g. $P_{initial}$, $V_{initial}$, (or $MFR_{initial}$ or $\phi_{initial}$), (deposition geometry)$_{initial}$, and $T_{0initial}$), 2) the final set of process variables (e.g. $P_{final}$, $V_{final}$, $\gamma_{final}$, (deposition geometry)$_{final}$, and $T_{0final}$), 3) the path through process variable space taken between the initial and final values of the process variables and 4) the rate of change of the values of the process variables (including a variable rate if one is used). The test can be used to study response behavior where the changes in values of the process variables are very rapid (e.g., for an instantaneous step change). In such a case, the rate of change (and the change in that rate if it varies over time) and the path of the transition from initial and final values of the process variable values are no longer variables in the tests. However, the number of potentially active variables that may need to be process mapped include 5 initial values plus 5 final values for a total of 10 values.

Mapping of Transient Response and Potential Simplifications

A process map for a process thermal characteristic (e.g., a P-V process map for melt pool area A) can be used in conjunction with the primary process variable rules for transient response to methodically map out transient response across process variable space. The mapping may be simplified to make it practical as a tool for characterizing transient behavior. Once a P-V process map is constructed for fixed values of γ, geometry, and part temperature $T_0$, response behavior becomes a function of $P_{initial}$, $V_{initial}$, $P_{final}$, $V_{final}$, the P-V path taken between the initial and final P and V values, and the rate or rates of the changes in values of the process variables.

Figure 9:
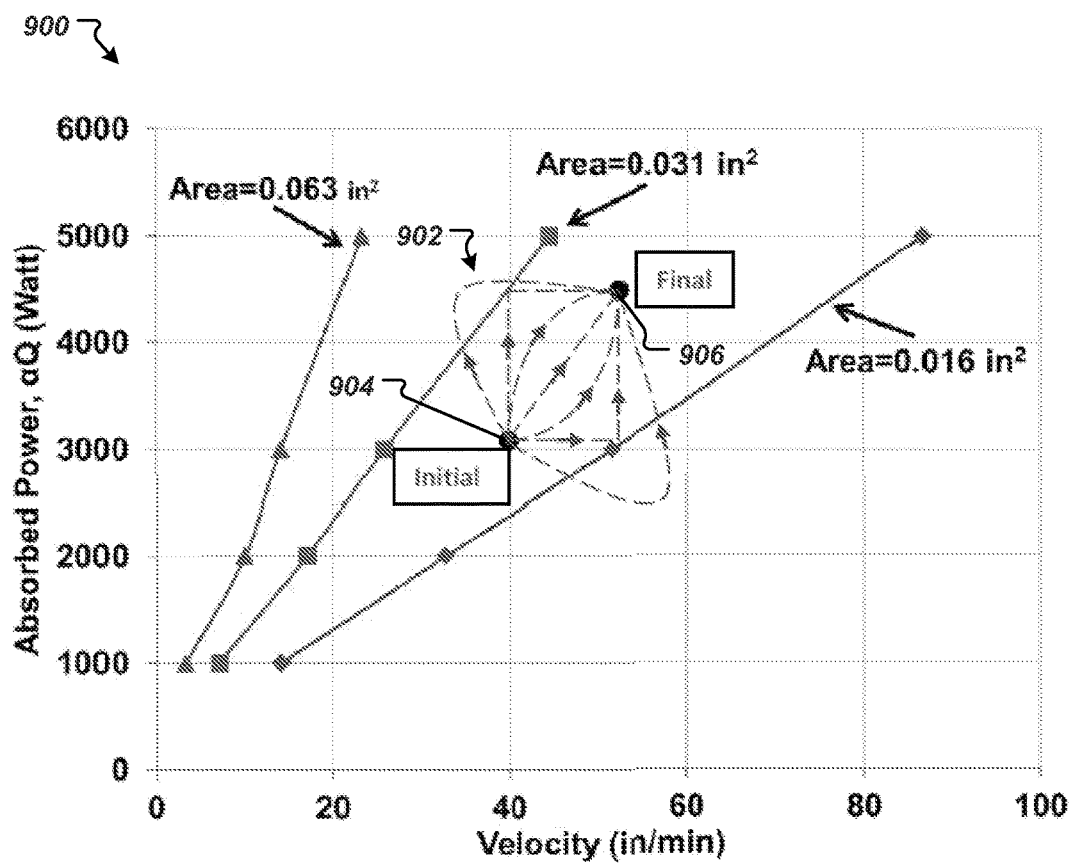
FIG. 9 is an example of a P-V process map showing multiple paths between an initial value and a final value of two P, V combinations.

FIG. 9 is an example of a P-V process map 900 showing multiple paths 902 between an initial value 904 and a final value 906 of two P, V combinations. As illustrated in FIG. 9, even practical paths 902 taken between the initial value 904 and the final value 906 can vary between paths of constant V (only P changes) followed by constant P (only V changes), constant P followed by constant V, and other paths. Thus, the methodical mapping of all practical P-V combinations and paths may be complicated. This description assumes that only P and V are being changed. In the general case, all 5 primary process variables (and then secondary process variables also) can be changed so that initial and final locations in processing space and paths between them involve 5 dimensions or more.

Maintaining a constant value of γ during P and V process variable changes may be difficult from a practical perspective. For most AM processes, MFR will be held constant as P and V values are changed. Because changes in P and V values result in a different melt pool area, and because changes in V change the amount of material input per unit travel distance, a fixed MFR will generally yield a change in γ. This unintentional change in γ will yield an unintentional change in the thermal process characteristic (e.g., melt pool area A) that is plotted on a constant γ P-V process map. In some cases, the dependence of the process characteristic on γ may not be strong, but in other cases this can be an important effect.

Figure 10:
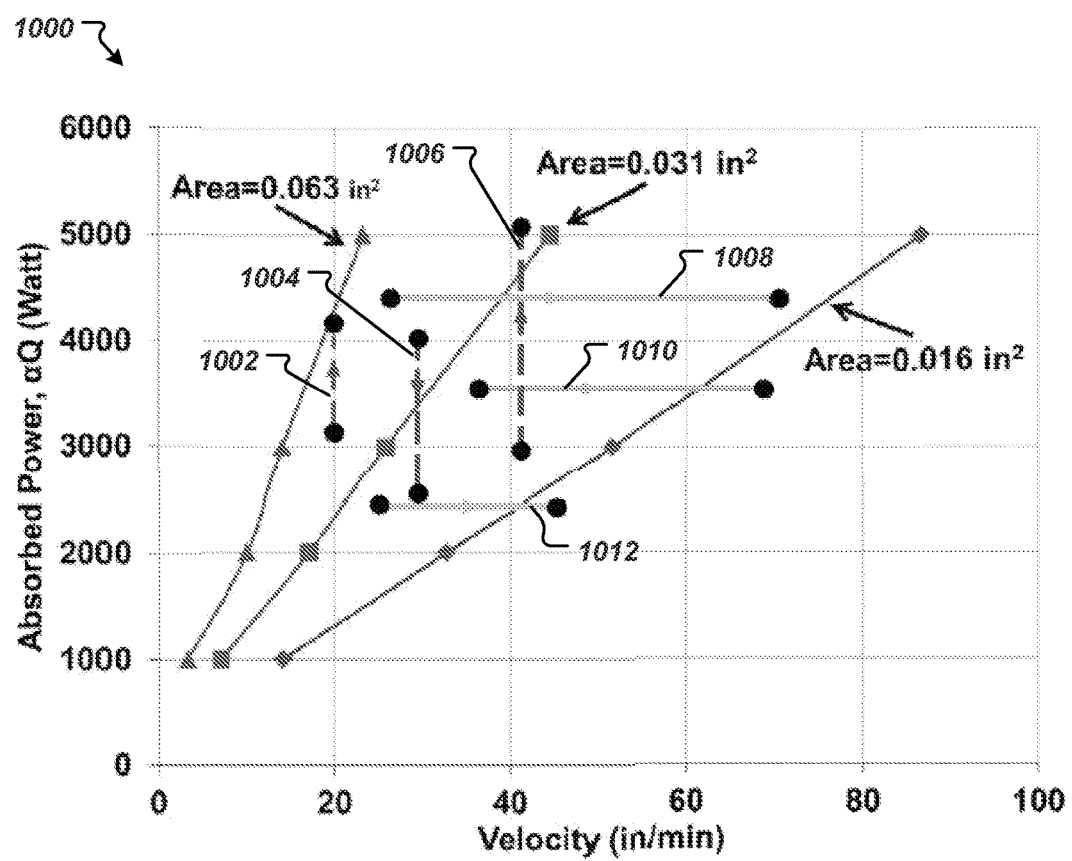
FIG. 10 is an example of a process map showing constant V paths and constant P paths.

FIG. 10 is an example of a process map 1000 showing constant V paths 1002, 1004, 1006 and constant P paths 1008, 1010, 1012. FIG. 10 demonstrates the somewhat simpler problem of paths that only involve constant V (only P changes) or constant P (only V changes). This greatly reduces the number of initial value and final value combinations of the process variables and reduces the paths between the two value combinations of the process variables values to 1.

Figure 11:
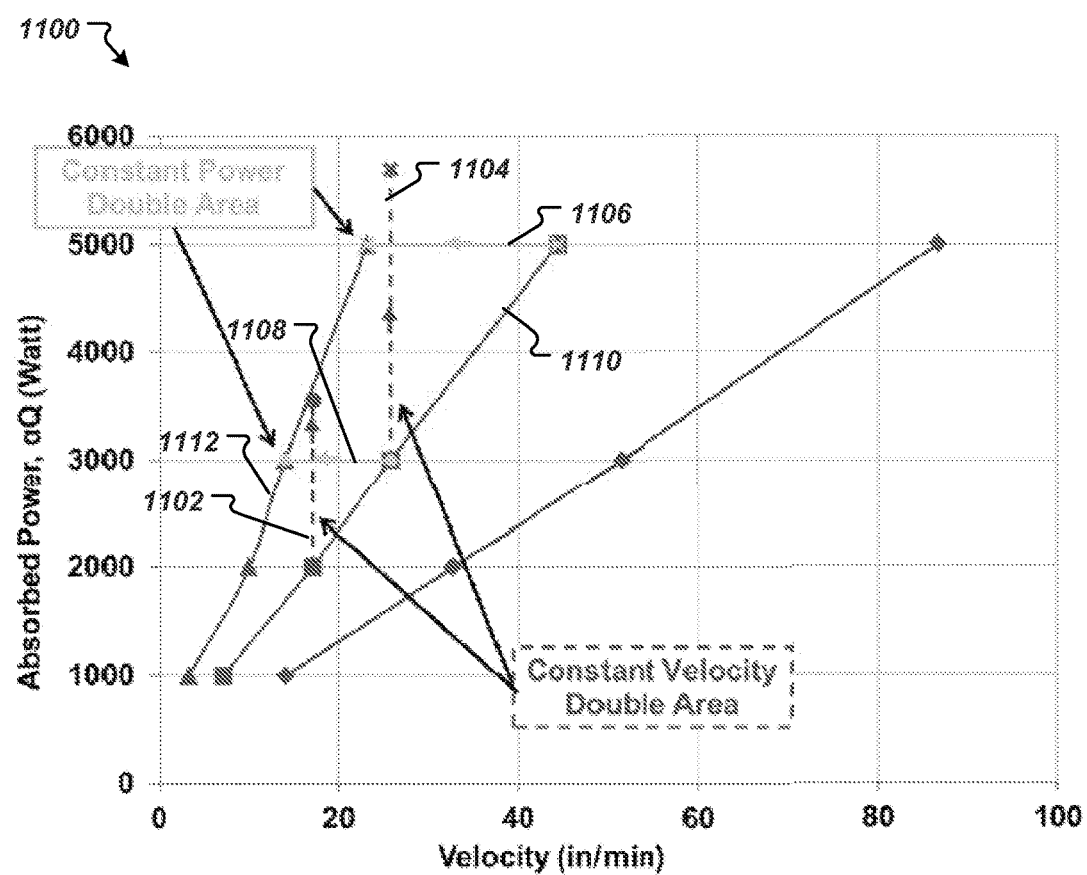
FIG. 11 is an example of a process map showing constant V paths and constant P paths starting on a constant A curve and ending on a constant A curve.

FIG. 11 is an example of a process map 1100 showing constant V paths 1102, 1104 and constant P paths 1106, 1108 starting on the same constant A curve 1110 and ending on the same constant A curve 1112.

Figure 12:
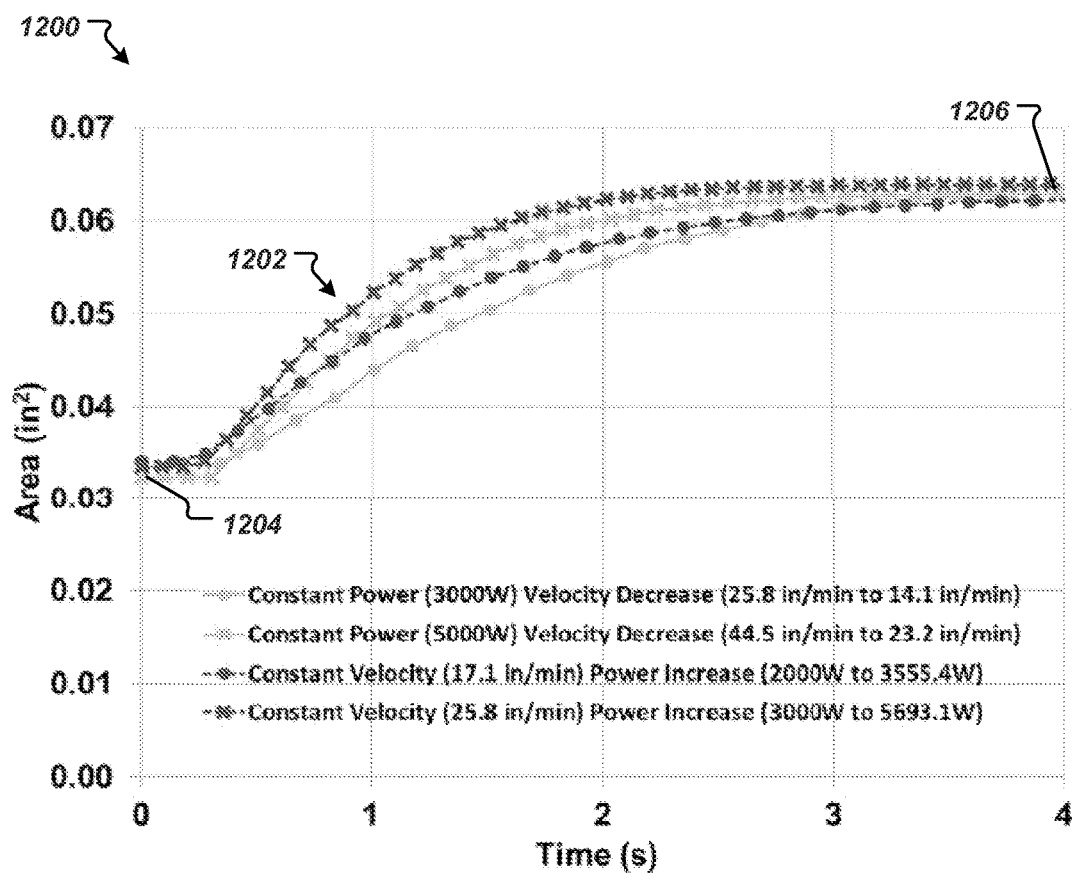
FIG. 12 is an example of a plot of curves showing transient behavior of area A versus time between two constant A curves.

FIG. 12 is an example of a plot 1200 of curves 1202 showing transient behavior (area A vs. time) between two constant A curves, e.g., constant A curves 1110, 1112 of FIG. 11. FIG. 12 shows curves 1202 of transient behaviors for the P, V value combinations shown in FIG. 11 (as determined by finite element numerical simulations involving instantaneous (step) changes in P or V) as a melt pool area A vs. time plot 1200. As shown in FIG. 12, the times needed to transition from one steady-state value of A 1204 to another steady-state value of A 1206 may be different between the combinations, and the transitional behavior in between the steady-state values 1204, 1206 may be different. Thus, the transient response for fixed values of MFR, deposition geometry, and $T_0$, may still need to be process mapped in terms of 4 variables, $P_{initial}$, $V_{initial}$, $P_{final}$, $V_{final}$.

Figure 13:
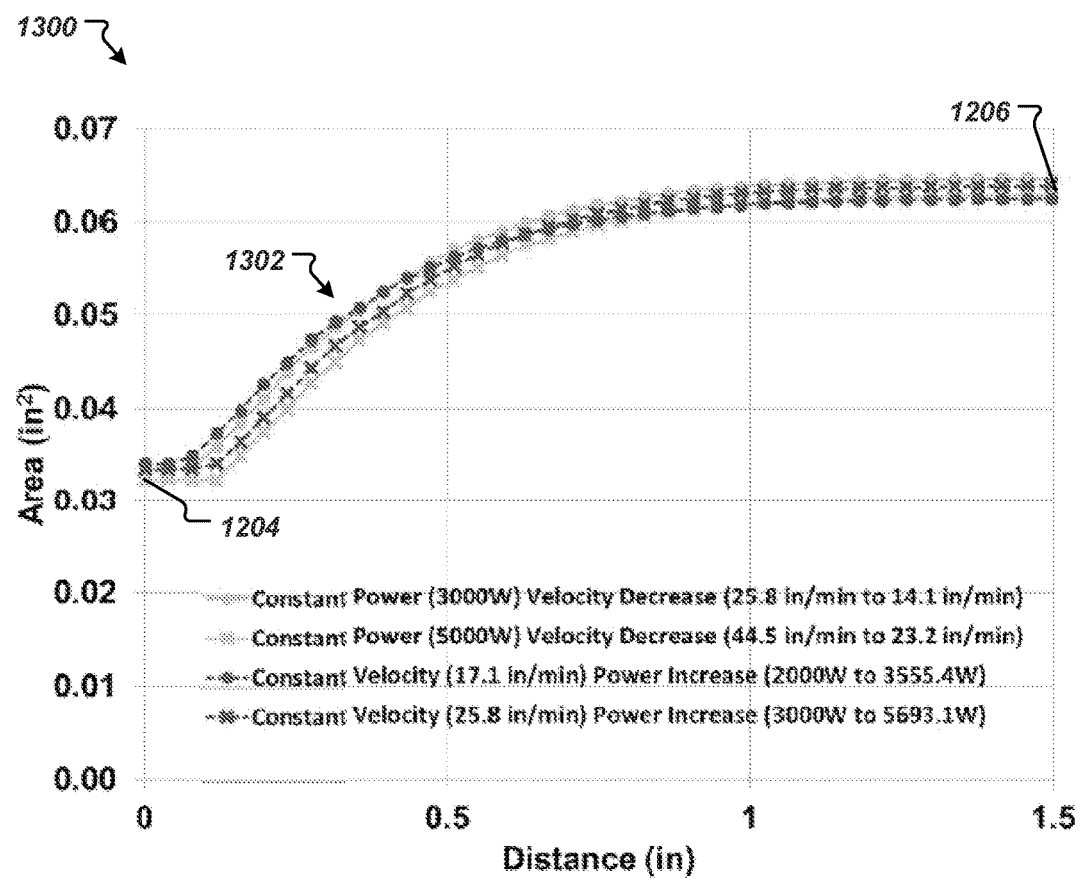
FIG. 13 is an example of a plot of curves showing transient behavior of area A versus distance between two constant A curves.

FIG. 13 is an example of a plot 1300 of curves 1302 showing transient behavior (area A vs. distance) between two constant A curves, e.g., constant A curves 1110, 1112 of FIG. 11. FIG. 13 shows curves 1302 of transient behaviors for the same P, V value combinations shown in FIG. 12 (data from the same numerical simulations) now plotted as melt pool area, A, vs. distance traveled after a step change in the values of the process variables. As shown in FIG. 13, the response behaviors and the response distances are now similar. Thus, for cases with the same $A_{initial}$ value 1204 and $A_{final}$ value 1206, the curves 1302 of the transient behavior expressed in terms of distances is essentially the same, independent of $P_{initial}$, $V_{initial}$, $P_{final}$, $V_{final}$.

This final simplification may be generic or may be seen in isolated cases, but it is an example of how methodical mapping of transient response may yield increased intuition and substantial simplification in characterizing response behavior over processing space. For instance, if this final simplification applies across a P-V process map (for fixed MFR, geometry, and $T_0$), then transient response behavior can be represented (process mapped) in terms of $A_{final}$ and $A_{initial}$, MFR, geometry, and $T_0$.

Figure 14:
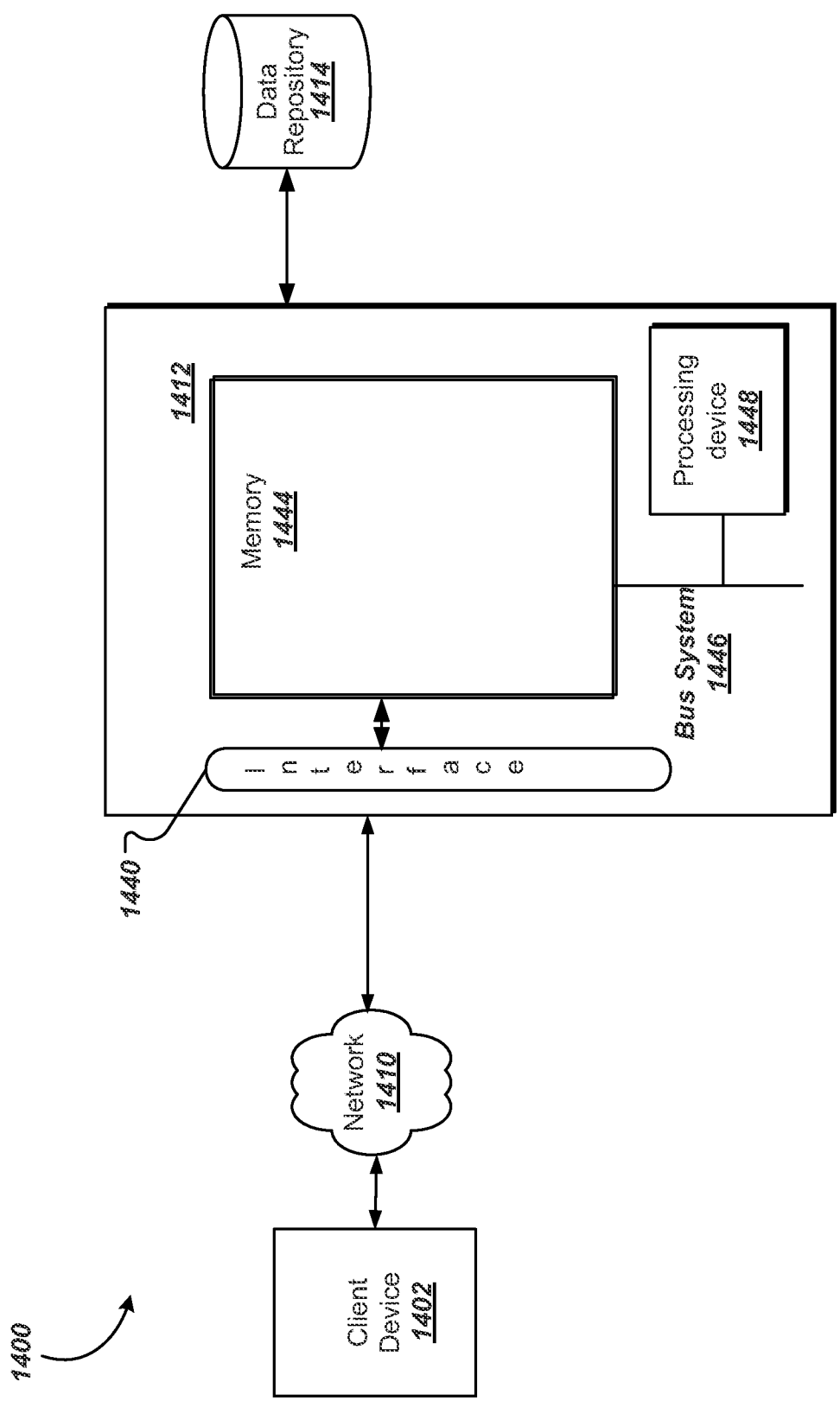
FIG. 14 is a block diagram of an example of a processing system environment for generating a process map.

FIG. 14 is a block diagram of an example of a processing system environment 1400 for generating a process map. In FIG. 14, a client device 1402 can be any sort of computing device capable of taking input from a user and communicating over network 1410 with server 1412 and/or with other client devices. For example, the client device 1402 can be mobile devices, desktop computers, laptops, cell phones, personal digital assistants ("PDAs"), servers, embedded computing systems, and so forth.

To provide for interaction with a user, the client device 1402 may include a display device (e.g., a CRT (cathode ray tube), LCD (liquid crystal display), touch screen display, or other monitor) for displaying information to the user, and a keyboard and a pointing device (e.g., a mouse or a trackball) by which the user can provide input to the computer. Other kinds of devices can be used to provide for interaction with a user as well. For example, feedback provided to the user can be any form of sensory feedback (e.g., visual feedback, auditory feedback, or tactile feedback). Input from the user can be received in any form, including acoustic, speech, or tactile input.

Server 1412 can be any of a variety of computing devices capable of receiving data, such as a server, a distributed computing system, a desktop computer, a laptop, a cell phone, a rack-mounted server, and so forth. Server 1412 may be a single server or a group of servers that are at a same location or at different locations. Server 1412 can be configured to execute the techniques and operations described herein to generate a process map. In an example, server 1412 is configured to transmit, over network 1410, information indicative of the generated process map to the client device 1402.

The illustrated server 1412 can receive data from the client device 1402 via input/output ("I/O") interface 1440. I/O interface 1440 can be any type of interface capable of receiving data over a network, such as an Ethernet interface, a wireless networking interface, a fiber-optic networking interface, a modem, and so forth. Server 1412 also includes a processing device 1448 and memory 1444. A bus system 1446, including, for example, a data bus and a motherboard, can be used to establish and to control data communication between the components of server 1412.

The illustrated processing device 1448 may include one or more microprocessors. Generally, processing device 1448 may include any appropriate processor and/or logic device that is capable of receiving and storing data, and of communicating over a network (not shown). Memory 1444 can include a hard drive and a random access memory storage device, such as a dynamic random access memory, or other types of non-transitory machine-readable storage devices. Memory 1444 stores computer programs (not shown) that are executable by processing device 1448 to perform the techniques described herein.

The techniques described herein can be implemented via computational platforms. Various implementations of the techniques described herein can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions.

Embodiments can be implemented in digital electronic circuitry, or in computer hardware, firmware, software, or in combinations thereof. An apparatus can be implemented in a computer program product tangibly embodied or stored in a machine-readable storage device for execution by a programmable processor; and method actions can be performed by a programmable processor executing a program of instructions to perform functions by operating on input data and generating output. The embodiments described herein, and other embodiments of the invention, can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object oriented programming language, or in assembly or machine language if desired; and in any case, the language can be a compiled or interpreted language.

Processors suitable for the execution of a computer program include, by way of example, both general and special purpose microprocessors, and any one or more processors of any kind of digital computer. Generally, a processor will receive instructions and data from a read-only memory or a random-access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Computer readable media for embodying computer program instructions and data include all forms of non-volatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in special purpose logic circuitry. Any of the foregoing can be supplemented by, or incorporated in, ASICs (application-specific integrated circuits).

Other embodiments are within the scope and spirit of the description claims. Additionally, due to the nature of software, functions described above can be implemented using software, hardware, firmware, hardwiring, or combinations of any of these. Features implementing functions may also be physically located at various positions, including being distributed such that portions of functions are implemented at different physical locations. The use of the term "a" herein and throughout the application is not used in a limiting manner and therefore is not meant to exclude a multiple meaning or a "one or more" meaning for the term "a." Additionally, to the extent priority is claimed to a provisional patent application, it should be understood that the provisional patent application is not limiting but includes examples of how the techniques described herein may be implemented.

A number of exemplary implementations of the invention have been described. Nevertheless, it will be understood by one of ordinary skill in the art that various modifications may be made without departing from the spirit and scope of the invention.

What is claimed is:

1. A method of controlling microstructural features in additive manufacturing, comprising:
   conducting a plurality of tests on process variables of a thermal process of an additive manufacturing process, with a test of the plurality of tests being associated with two combinations of process variables, the test having first values for a first combination of process variables at a first time and second values for a second combination of process variables at a second time, the test comprising:
   locally heating a region of a structure, wherein the local heating results in formation of a thermal field in the structure; and
   assessing one or more thermal characteristics of the thermal field during a transition among first values of the first combination of process variables and second values of the second combination of process variables;
   based on results of the plurality of tests, generating a process map of a transient response of the one or more thermal characteristics of the thermal field, with the transient response based on a function of the first values of the first combination of process variables and the second values of the second combination of process variables; and
   controlling, in the additive manufacturing process, microstructure features in a region of an object by:
   determining values for the process variables of the thermal process, the values being a function of first and second values specified by the process map of the transient response of the one or more thermal characteristics of the thermal field; and
   adjusting the values for the process variables of the thermal process to cause the thermal field in the object.

2. The method of claim 1, wherein the process variables of each of the first and second combinations are selected from a group comprising a power (P) variable associated with the thermal process, a translation speed (V) variable associated with the thermal process, a material feed rate (MFR) variable (or variable related to MFR) used in the thermal process, one or more structure geometry variables, and a structure temperature ($T_0$) variable.

3. The method of claim 1, wherein:
   the first values for the first combination of process variables at the first time comprises a first value for a first process variable at the first time and a first value for a second process variable at the first time;
   the second values for the second combination of process variables at the second time comprises a second value for the first process variable at the second time and a second value for the second process variable at the second time; and
   assessing the one or more thermal characteristics comprises assessing the one or more thermal characteristics during a transition between the first values and the second values of the first process variable and the second process variable while values of other process variables are held constant.

4. The method of claim 1, wherein:
   the first values for the first combination of process variables at the first time comprises a first value for a first process variable;
   the second values for the second combination of process variables at the second time comprises a second value for the first process variable at the second time; and
   assessing the one or more thermal characteristics comprises assessing the one or more thermal characteristics during a transition between the first value and the second value of the first process variable while values of other process variables are held constant.

5. The method of claim 1, wherein the one or more thermal characteristics of the thermal field comprises a dimension of the thermal field, a temperature derivative, a thermal gradient, a cooling rate, an average temperature, or a temperature integral.

6. The method of claim 1, wherein assessing the one or more thermal characteristics comprises tracking values of the one or more thermal characteristics over a time or a distance needed to transition from an initial steady-state value of the one or more thermal characteristics to a final steady-state value of the one or more thermal characteristics.

7. The method of claim 1, wherein the transient response is further based on a function of at least one of a rate of change between the first combination of process variables and the second combination of process variables, and a path through process variable space between the first combination of process variables and the second combination of process variables.

8. The method of claim 7, wherein the transient response is further based on a change in geometry of the structure.

9. The method of claim 7, wherein the rate of change is a variable rate of change between the first combination of process variables and the second combination of process variables.

10. The method of claim 1, wherein locally heating the region comprises depositing a bead of material onto a surface of the structure, and wherein the thermal field comprises a melt pool.

11. The method of claim 10, wherein depositing the bead of material comprises melting a material source with a heat source.

12. The method of claim 1, wherein locally heating the region comprises forming a melt pool on a surface of the structure, and wherein the thermal field comprises the melt pool.

13. The method of claim 1, wherein the thermal process comprises an additive manufacturing (AM) process.

14. The method of claim 1, wherein the tests comprise one or more experimental tests.

15. The method of claim 1, wherein the tests comprise one or more simulations.

16. The method of claim 1, further comprising:
using the process map to select process variable values for the two combinations of process variables to yield a selected response time of the one or more thermal characteristics.

17. The method of claim 1, further comprising:
generating a plurality of process maps characterizing the thermal process for forming the structure, each process map corresponding to at least one of a geometry of the structure and a temperature of the structure.

18. The method of claim 17, further comprising:
decomposing a fabrication of a complex structure into a combination of one or more geometries; and
controlling the fabrication of the complex structure based on the process maps for forming each of the one or more geometries.

19. The method of claim 18, wherein a geometry of the complex structure includes at least one of a height of the geometry and a width of the geometry.

20. The method of claim 1, wherein the structure comprises a part that is fabricated in the thermal process.

21. The method of claim 1, wherein the actions of conducting and generating are implemented by one or more processing devices.

* * * * *

UNITED STATES PATENT AND TRADEMARK OFFICE
CERTIFICATE OF CORRECTION

PATENT NO. : 10,035,220 B2
APPLICATION NO. : 14/776445
DATED : July 31, 2018
INVENTOR(S) : Jack Lee Beuth, Jr. and Jason Cho Fox Page 1 of 1

It is certified that error appears in the above-identified patent and that said Letters Patent is hereby corrected as shown below:

In the Specification

Column 1, Line 14, delete "PCTIUS2013/055422," and insert -- PCT/US2013/055422, --

Signed and Sealed this
Ninth Day of October, 2018

Andrei Iancu
*Director of the United States Patent and Trademark Office*

UNITED STATES PATENT AND TRADEMARK OFFICE
CERTIFICATE OF CORRECTION

PATENT NO. : 10,035,220 B2  
APPLICATION NO. : 14/776445  
DATED : July 31, 2018  
INVENTOR(S) : Jack Lee Beuth, Jr. and Jason Cho Fox Page 1 of 1

It is certified that error appears in the above-identified patent and that said Letters Patent is hereby corrected as shown below:

In the Specification

Column 1, Line 23, delete "This invention was made with partial government support under grants CMMI-0700538 and CMMI-1131579 awarded by the National Science Foundation. The government has certain rights in the invention." and insert -- This invention was made with United States government support under CMMI0700538, and CMMI1131579 awarded by the National Science Foundation. The U.S. government has certain rights in the invention. --

Signed and Sealed this  
Twenty-eighth Day of January, 2025

Coke Morgan Stewart  
*Acting Director of the United States Patent and Trademark Office*